US010527151B1

(12) United States Patent
McCune et al.

(10) Patent No.: US 10,527,151 B1
(45) Date of Patent: Jan. 7, 2020

(54) GAS TURBINE ENGINE WITH GEARED ARCHITECTURE

(71) Applicant: United Technologies Corporation, Farmington, CT (US)

(72) Inventors: Michael E. McCune, Colchester, CT (US); Lawrence E. Portlock, Bethany, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 16/122,236

(22) Filed: Sep. 5, 2018

Related U.S. Application Data

(63) Continuation of application No. 15/892,210, filed on Feb. 8, 2018, now Pat. No. 10,082,105, which is a continuation of application No. 14/753,048, filed on Jun. 29, 2015, now Pat. No. 10,107,231, which is a continuation-in-part of application No. 13/346,120, filed on Jan. 9, 2012, now abandoned, which is a
(Continued)

(51) Int. Cl.
*F16H 57/04* (2010.01)
(52) U.S. Cl.
CPC ................................ *F16H 57/04* (2013.01)
(58) Field of Classification Search
CPC ....................................................... F16H 57/04
See application file for complete search history.

(56) References Cited

U.S. PATENT DOCUMENTS

| 2,258,792 A | 4/1941 | New |
| 2,288,792 A | 7/1942 | Daniels |
| 2,684,591 A | 7/1954 | Lundquist |

(Continued)

FOREIGN PATENT DOCUMENTS

| CN | 1952435 | 4/2007 |
| EP | 0791383 | 8/1997 |

(Continued)

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
(Continued)

*Primary Examiner* — Derek D Knight
(74) *Attorney, Agent, or Firm* — Carlson, Gaskey & Olds, P.C.

(57) ABSTRACT

A gas turbine engine includes a bypass ratio greater than about ten (10). A fan is supported on a fan shaft and has a plurality of fan blades. There is a gutter with an annular channel. A gear system is connected to the fan shaft. There is a plurality of planetary gears and a ring gear with an aperture that is axially aligned with the annular channel. The ring gear includes a first portion with a first set of opposed angled teeth separated by a trough from a second portion with a second set of opposed angled teeth. A torque frame at least partially supports the gear system. A low pressure turbine has an inlet, an outlet, and a low pressure turbine pressure ratio greater than 5:1 and a low fan pressure ratio of less than 1.45 across the fan blade alone.

29 Claims, 3 Drawing Sheets

Related U.S. Application Data continuation-in-part of application No. 11/504,220, filed on Aug. 15, 2006, now Pat. No. 8,753,243.

(56) References Cited

U.S. PATENT DOCUMENTS

| | | |
|---|---|---|
| 2,936,655 A | 5/1960 | Peterson et al. |
| 3,021,731 A | 2/1962 | Stoeckicht |
| 3,160,026 A | 12/1964 | Rosen |
| 3,194,487 A | 7/1965 | Tyler et al. |
| 3,287,906 A | 11/1966 | McCormick |
| 3,352,178 A * | 11/1967 | Lindgren ............... F16H 1/28 475/343 |
| 3,412,560 A | 11/1968 | Gaubatz |
| 3,664,612 A | 5/1972 | Skidmore et al. |
| 3,722,323 A | 3/1973 | Welch |
| 3,747,343 A | 7/1973 | Rosen |
| 3,754,484 A | 8/1973 | Roberts |
| 3,820,719 A | 6/1974 | Clark |
| 3,883,303 A | 5/1975 | Roberts |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,284,174 A | 8/1981 | Salvana et al. |
| 4,289,360 A | 9/1981 | Zirin |
| 4,478,551 A | 10/1984 | Honeycutt, Jr. et al. |
| 4,583,413 A * | 4/1986 | Lack ............... F16H 1/2809 475/159 |
| 4,649,114 A | 3/1987 | Miltenburger et al. |
| 4,696,156 A | 9/1987 | Burr et al. |
| 4,979,362 A | 12/1990 | Vershure, Jr. |
| 5,102,379 A | 4/1992 | Pagluica et al. |
| 5,141,400 A | 8/1992 | Murphy et al. |
| 5,211,541 A | 5/1993 | Fledderjohn et al. |
| 5,302,031 A | 4/1994 | Yuasa |
| 5,317,877 A | 6/1994 | Stuart |
| 5,361,580 A | 11/1994 | Ciokajlo et al. |
| 5,391,125 A * | 2/1995 | Turra ............... F16H 1/2836 475/331 |
| 5,433,674 A | 7/1995 | Sheridan et al. |
| 5,447,411 A | 9/1995 | Curley et al. |
| 5,466,198 A | 11/1995 | McKibbin et al. |
| 5,472,383 A | 12/1995 | McKibbin |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,158,210 A | 12/2000 | Orlando |
| 6,223,616 B1 * | 5/2001 | Sheridan ............... F16H 1/2827 184/6.12 |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,402,654 B1 | 6/2002 | Lanzon et al. |
| 6,517,341 B1 | 2/2003 | Brun et al. |
| 6,530,858 B1 | 3/2003 | Usoro et al. |
| 6,607,165 B1 | 8/2003 | Manteiga et al. |
| 6,669,597 B1 | 12/2003 | Usoro et al. |
| 6,709,492 B1 | 3/2004 | Spadaccini et al. |
| 6,732,502 B2 | 5/2004 | Seda et al. |
| 6,814,541 B2 | 11/2004 | Evans et al. |
| 7,021,042 B2 | 4/2006 | Law |
| 7,219,490 B2 | 1/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath |
| 7,662,059 B2 | 2/2010 | McCune |
| 7,704,178 B2 * | 4/2010 | Sheridan ............... F01D 25/18 475/159 |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,997,868 B1 | 8/2011 | Liang et al. |
| 8,074,440 B2 | 12/2011 | Kohlenberg |
| 8,205,432 B2 | 6/2012 | Sheridan |
| 8,894,538 B2 | 11/2014 | McCune |
| 9,752,511 B2 * | 9/2017 | McCune ............... F02K 3/06 |
| 2002/0064327 A1 | 5/2002 | Toda et al. |
| 2004/0112041 A1 | 6/2004 | Law |
| 2005/0026745 A1 | 2/2005 | Mitrovic |
| 2006/0228206 A1 | 10/2006 | Decker et al. |
| 2008/0003096 A1 | 1/2008 | Kohli et al. |
| 2008/0006018 A1 | 1/2008 | Sheridan et al. |
| 2008/0044276 A1 | 2/2008 | McCune et al. |
| 2008/0096714 A1 | 4/2008 | McCune |
| 2008/0116009 A1 | 5/2008 | Sheridan et al. |
| 2008/0317588 A1 | 12/2008 | Grabowski et al. |
| 2009/0053058 A1 | 2/2009 | Kohlenberg et al. |
| 2009/0056306 A1 | 3/2009 | Suciu et al. |
| 2009/0056343 A1 | 3/2009 | Suciu et al. |
| 2009/0081039 A1 | 3/2009 | McCune et al. |
| 2009/0090096 A1 | 4/2009 | Sheridan |
| 2009/0111639 A1 | 4/2009 | Klingels |
| 2009/0293278 A1 | 12/2009 | Duong et al. |
| 2009/0298640 A1 * | 12/2009 | Duong ............... F16D 3/72 475/347 |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0331139 A1 | 12/2010 | McCune |
| 2011/0130246 A1 * | 6/2011 | McCune ............... F01D 25/164 477/115 |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2012/0275904 A1 | 11/2012 | McCune et al. |
| 2013/0023378 A1 | 1/2013 | McCune et al. |
| 2014/0154054 A1 | 6/2014 | Sheridan et al. |
| 2014/0230403 A1 | 8/2014 | Merry et al. |
| 2015/0065285 A1 | 3/2015 | McCune et al. |

FOREIGN PATENT DOCUMENTS

| | | |
|---|---|---|
| EP | 1114949 | 7/2001 |
| EP | 1142850 | 10/2001 |
| EP | 1876338 | 1/2008 |
| EP | 1890054 | 2/2008 |
| EP | 1925855 | 5/2008 |
| EP | 2224100 | 9/2010 |
| EP | 2559913 | 2/2013 |
| EP | 2610463 | 7/2013 |
| FR | 1357038 | 4/1964 |
| GB | 1516041 | 6/1978 |
| GB | 2041090 | 9/1980 |
| GB | 2426792 | 12/2006 |
| JP | 5248267 | 9/1993 |
| JP | 9317833 | 12/1997 |
| JP | 2001208146 | 8/2001 |
| JP | 3920031 | 5/2007 |
| JP | 2015137649 | 7/2015 |
| WO | 2007038674 | 4/2007 |
| WO | 20130147951 | 10/2013 |
| WO | 2015017041 | 2/2015 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

(56) References Cited

OTHER PUBLICATIONS

Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoday related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko—Progress D-436. Jane's Aero-engines, Aero-engines—Turbofan. Feb. 8, 2012.
Ivchenko—Progress AI-727M. Jane's Aero-engines, Aero-engines—Turbofan. Nov. 27, 2011.
Ivchenko—Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance

(56) References Cited

OTHER PUBLICATIONS and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., MacMartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Roux, E. (2007). Turbofan and turbojet engines database handbook. Editions Elodie Roux. Blagnac: France. pp. 1-595.

Wilfert, G. Architectures, (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003 . . . p. 1-6 and Appendices.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal baffler coatings. Annual. Rev. Mater. Res. vol. 33. 2003. pp. 383-417.

Lee, K.N. (2000). Current status of environmental baffler coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMGs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of mitron-scale polycrystalline silicon structural films subjected to high-cycle fatigue loading. Acta Materialia vol. 50. 2002 pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Winn, A. (Ed). (1990). Wide Chord Fan Club. Flight International, 4217(137). May 23-29, 1990. pp. 34-38.

Parker, R.G. and Lin, J. (2001). Modeling, modal properties, and mesh stiffness variation instabilities of planetary gears. Prepared for NASA. NASA/CR-2001-210939. May 2001. pp. 1-111.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Dudley, D.W., Ed. (1954). Handbook of practical gear design. Lancaster, PA: Technomic Publishing Company, Inc. pp. 3.96-102 and 8.12-18.

Dudley, D.W., Ed. (1962). Gear handbook. New York, NY: McGraw-Hill. pp. 3.14-18 and 12.7-12.21.

Dudley, D.W., Ed. (1994). Practical gear design. New York, NY: McGraw-Hill. pp. 119-124.

(56) References Cited

OTHER PUBLICATIONS

Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to-3D Engine Upgrade Program. Oct. 2005. pp. 1-4.
U.S. Department of Transportation: Federal Aviation Administration Type Certificate Data Sheet No. E6WE. Dated: May 9, 2000. p. 1-.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A porgram to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
MacIsaac, B. and Langston, R. (2011). Gas turbine propulsion systems. Chichester, West Sussex: John Wiley & Sons, Ltd. pp. 260-265.
Datasheet. CFM56-5B For the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 710-712.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.

(56) References Cited

OTHER PUBLICATIONS

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal sparlsuperhybrid shell composite fan blades. Prepared for NASA. NASA-CR-159594. Aug. 1979. pp. 1-127.
"Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Munt, R. (1981). Aircraft technology assessment Progress in low emissions engine. Technical Report. May 1981. pp. 1-171.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Aug. 17, 2016.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). NASA Technical Paper. Nov. 1979. pp. 1-68.
The International Preliminary Report on Patentability for PCT Application No. PCT/US2012/071906, dated Jul. 24, 2014.
Meier, N (2005). Civil Turbojet/Turbofan Specifications. Retrieved from http://www.jet-engine.net/civtfspec.html.
Zalud, "Gears Put a New Spin on Turbofan Performance" Machine Design, Nov. 5, 1998, 2010Penton Media, Inc., 5 pp.
The European Search Report and Written Opinion for European Application No. EP 12198136, dated Aug. 21, 2013.

(56) References Cited

OTHER PUBLICATIONS

The International Search Report and Written Opinion for International Application No. PCT/US2012/071906, dated Aug. 22, 2013.
Kandebo; Geared-Turbofan Engine Design Targets Cost, Complexity, Aviation Week & Space Technology; New York; Feb. 23, 1998, 4 pp.
Hendricks et al, "Performance and Weight Estimates for an Advanced Open Rotor Engine" NASA/TM-2012-217710, Sep. 2012, 20 pp.
Gunston, "Jane's Aero-Engines" Pratt & Whitney/USA, Mar. 2000, JAEng-Issue 7, 5 pp.
Japanese Office Action for Japanese Application No. 2007-202444, dated Aug. 3, 2010.
European Search Report for EP Application No. 07253078.5, dated Dec. 5, 2007.
Notice of Opposition to Patent No. 2610463. United Technologies Corporation opposed by Safran Aircraft Engines. Dated Aug. 3, 2016.
Decision Institution of Inter Partes Review. *General Electric Company.*, Petitioner, v. *United Technologies Corp.*, Patent Owner. IPR2017-01001. U.S. Pat. No. 8,894,538. Entered Jul. 10, 2017. pp. 1-4.
European Search Report for European Application No. 16183877.6 dated Jan. 5, 2017.
Petition for Inter Partes Review of U.S. Pat. No. 8,894,538. *General Electric Company*, Petitioner, v. *United Technologies Corporation*, Patent Owner. Filed Mar. 1, 2017.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
European Search Report for European Application No. 16174068.3 dated Nov. 22, 2016.
Extended European Search Report for European Application No. 16171476.1 dated Oct. 6, 2016.
European Search Report for European Patent Application No. 12198045.2 completed Sep. 7, 2015.
European Search Report for European Patent Application No. 18203501.4, dated Feb. 11, 2019.

* cited by examiner

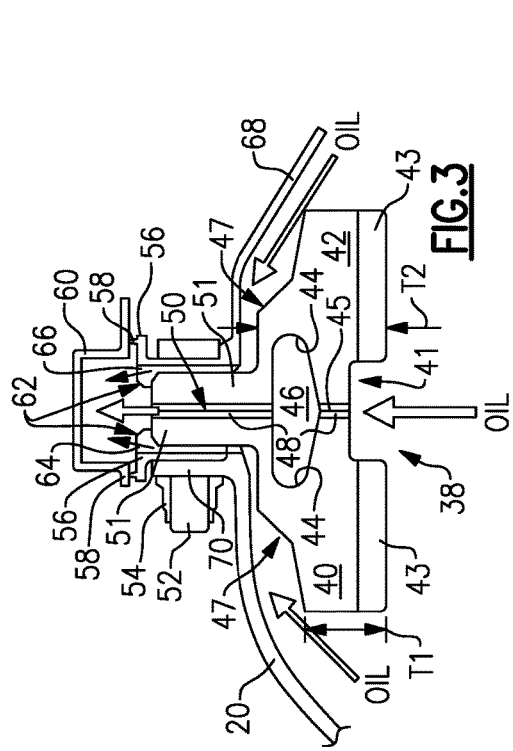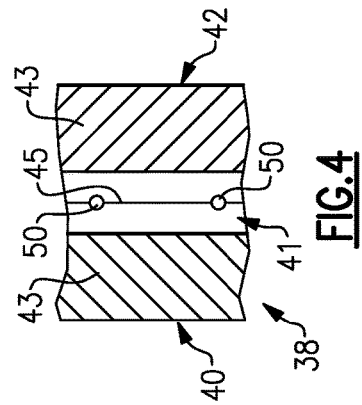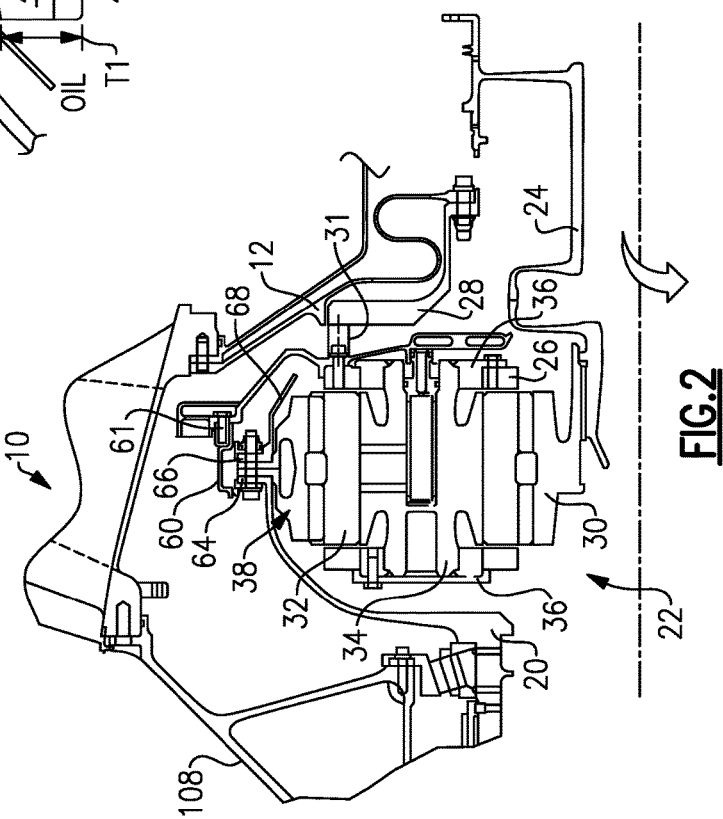

GAS TURBINE ENGINE WITH GEARED ARCHITECTURE

CROSS REFERENCE TO RELATED APPLICATIONS

The present disclosure is a continuation of U.S. patent application Ser. No. 15/892,210, filed Feb. 8, 2018, which is a continuation of U.S. patent application Ser. No. 14/753,048, filed Jun. 29, 2015, which was a continuation-in-part of U.S. patent application Ser. No. 13/346,120, filed Jan. 9, 2012, which was a continuation-in-part of U.S. patent application Ser. No. 11/504,220, filed Aug. 15, 2006, now U.S. Pat. No. 8,753,243, granted Jun. 17, 2014.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY

In one exemplary embodiment, a gas turbine engine includes a bypass ratio greater than about ten (10). A fan is supported on a fan shaft and has a plurality of fan blades. There is a gutter with an annular channel. A gear system is connected to the fan shaft. There is a plurality of planetary gears and a ring gear with an aperture that is axially aligned with the annular channel. The ring gear includes a first portion with a first set of opposed angled teeth separated by a trough from a second portion with a second set of opposed angled teeth. A torque frame at least partially supports the gear system. A low pressure turbine has an inlet, an outlet, and a low pressure turbine pressure ratio greater than 5:1 and a low fan pressure ratio of less than 1.45 across the fan blade alone.

In a further embodiment of any of the above, a support relative to a fixed housing facilitates segregation of vibrations.

In a further embodiment of any of the above, there is an input to the gear system that facilitates segregation of vibrations.

In a further embodiment of any of the above, the gear system includes a sun gear that has a sun gear splined connection.

In a further embodiment of any of the above, the input includes an input splined connection complementary to the sun gear splined connection. The gear system includes a gear reduction ratio of greater than 2.5.

In a further embodiment of any of the above, the fan shaft is supported by at least one tapered roller bearing.

In a further embodiment of any of the above, a fan tip speed less than 1150 ft/second.

In a further embodiment of any of the above, a fan tip speed is less than 1150 ft/second. A fan is on a fan shaft and has a plurality of fan blades and a low fan pressure ratio of less than 1.45 across the fan blades alone.

In a further embodiment of any of the above, the first portion and the second portion of the ring gear each include a radially extending flange that extends radially outward away from a corresponding set of opposed angled teeth. The fan shaft includes a radially extending flange connected to the radially extending flange on the first portion of the ring gear and the radially extending flange on the second portion of the ring gear.

In a further embodiment of any of the above, a seal is attached to at least one of the radially extending flanges on the ring gear or the radially extending flange on the fan shaft.

In a further embodiment of any of the above, the seal includes an oil return passage.

In a further embodiment of any of the above, the oil return passage includes a slot.

In a further embodiment of any of the above, the slot is located in the seal.

In a further embodiment of any of the above, the slot is located in the radially extending flange on the fan shaft.

In a further embodiment of any of the above, the gutter is for collecting oil expelled from the gear system.

In a further embodiment of any of the above, a fan tip speed less than 1150 ft/second.

In a further embodiment of any of the above, the gutter is formed from a soft material.

In a further embodiment of any of the above, the soft material is aluminum. In another exemplary embodiment, a gas turbine engine includes a fan supported on a fan shaft by at least one roller bearing and has a plurality of fan blades. A bypass ratio is greater than about ten (10). There is a gutter with an annular channel. A planetary gear system is connected to the fan shaft. The gear system has a gear reduction ratio of greater than 2.5 and a plurality of intermediate gears. A ring gear with an aperture is axially aligned with the annular channel. The ring gear includes a first portion separated from a second portion. The first portion and the second portion each include a radially extending flange that extends radially outward away from a corresponding set of opposed angled teeth. A torque frame is at least partially supporting the gear system with respect to the housing which facilitates the segregation of vibrations and other transients.

In a further embodiment of any of the above, there is an input to the gear system which facilitates segregation of vibrations.

In a further embodiment of any of the above, the gear system includes a sun gear that has a sun gear splined connection. The input includes an input splined connection complementary to the sun gear splined connection.

In a further embodiment of any of the above, the roller bearing is a tapered roller bearing.

In a further embodiment of any of the above, the gutter is for collecting oil expelled from the gear system.

In a further embodiment of any of the above, the gutter is formed from a soft material.

In a further embodiment of any of the above, the soft material is aluminum.

In a further embodiment of any of the above, a low pressure turbine has an inlet, an outlet, and a low pressure turbine pressure ratio greater than 5:1. A low fan pressure ratio of less than 1.45 which is measured across the fan blades alone.

In a further embodiment of any of the above, the fan shaft includes a radially extending flange which is connected to the radially extending flange on the first portion of the ring gear and the radially extending flange on the second portion of the ring gear.

In a further embodiment of any of the above, a seal is attached to at least one of the radially extending flanges on the ring gear or the radially extending flange on the fan shaft.

In a further embodiment of any of the above, the seal includes an oil return passage.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION

Figure 1:
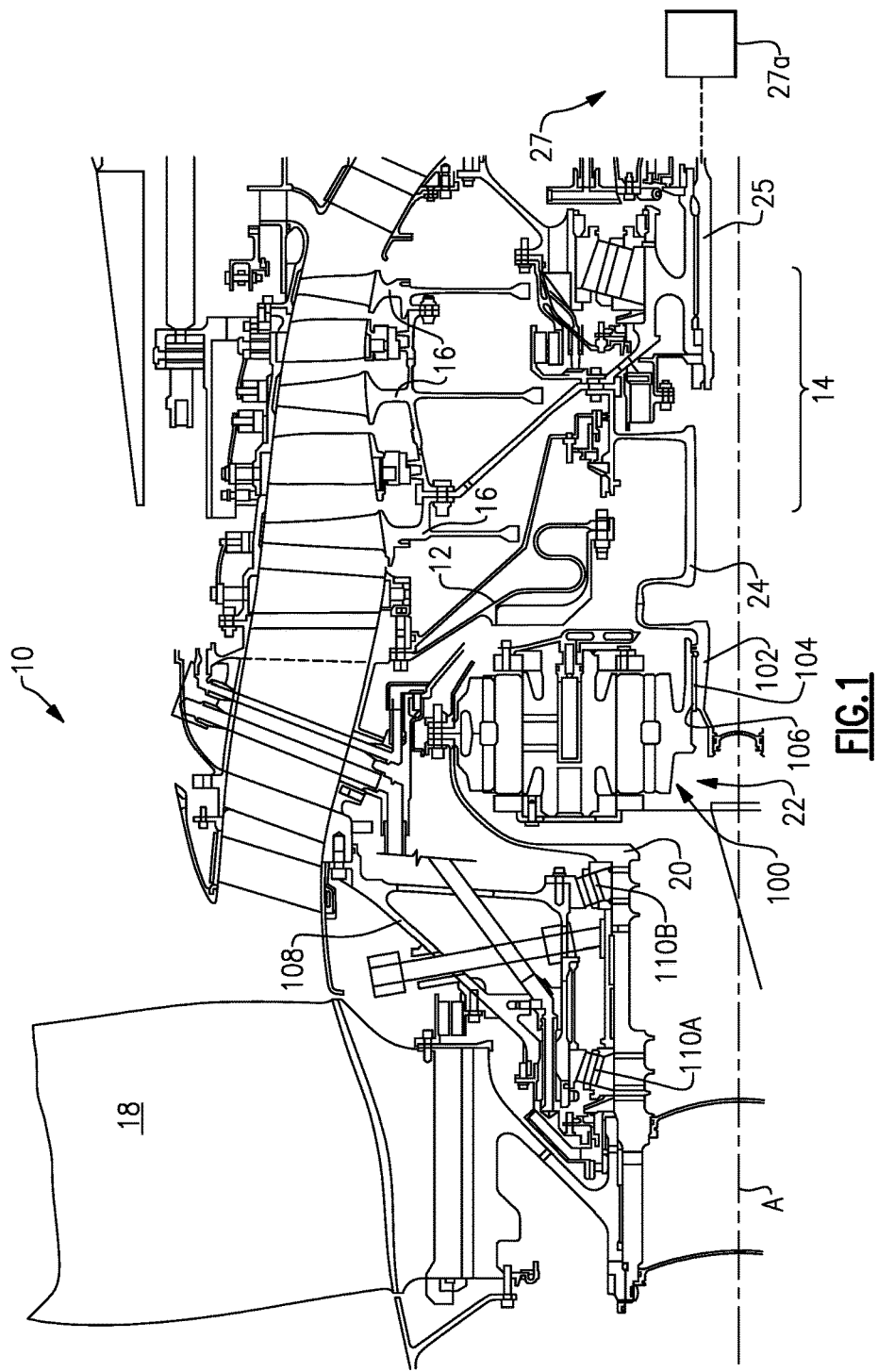
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22. The engine 10 is a high-bypass geared architecture aircraft engine. In one disclosed, non-limiting embodiment, the engine 10 bypass ratio is greater than about six (6) to ten (10), the gear train 22 is an epicyclic gear train such as a planetary gear system or other gear system with a gear reduction ratio of greater than about 2.3 and the low pressure turbine 18 has a pressure ratio that is greater than about 5. The engine 10 in one non-limiting embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 27a (shown schematically) has a pressure ratio that is greater than 5:1. As understood, the low pressure turbine 27a is downstream of at least one upstream, or high pressure turbine. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan 18 of the engine 10 is designed for a particular flight condition—typically cruise at about 0.8 M and about 35,000 feet. The flight condition of 0.8 M and 35,000 ft, with the engine at its best fuel consumption—also known as "bucket cruise TSFC"—is the industry standard parameter of lbm of fuel being burned divided by lbf of thrust the engine produces at that minimum point. "Low fan pressure ratio" is the pressure ratio across the fan blade alone, without the FEGV system 36. The low fan pressure ratio as disclosed herein according to one non-limiting embodiment is less than 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than 1150 ft/second.

The gear train 22 generally includes a fan drive gear system (FDGS) 100 driven by the compressor shaft 24 through an input coupling 102. The input coupling 102 both transfers torque from the compressor shaft 24 to the gear train 22 and facilitates the segregation of vibrations and other transients therebetween.

The input coupling 102 may include an interface spline 102 joined, by a gear spline 106, to the sun gear 30. The sun gear 30 is in meshed engagement with multiple star gears 32. Each star gear 32 is also in meshed engagement with rotating ring gear 38 that is mechanically connected to the fan shaft 20. Since the star gears 32 mesh with both the rotating ring gear 38 as well as the rotating sun gear 30, the star gears 32 rotate about their own axes to drive the ring gear 38. The rotation of the ring gear 38 is conveyed to the fan 20 through the fan shaft 20 to thereby drive the fan 18 at a lower speed than the turbine shaft 25.

In the example arrangement shown, the epicyclic gear train 22 is a star gear train. Referring to FIG. 2, the epicyclic gear train 22 includes the sun gear 30 that is connected to the compressor shaft 24, which provides rotational input, by the splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

The torque frame 28 supports the carrier 26 with respect to the housing 12 such as a front center body which facilitates the segregation of vibrations and other transients therebetween. It should be understood that various gas turbine engine case structures may alternatively or additionally be provided.

The fixed housing 12 may further include a number 1 and 1.5 bearing support frame 108 which is commonly referred to as a "K-frame" which supports the number 1 and number 1.5 bearing systems 110A, 110B to support the fan shaft 20 (FIG. 1). The number 1 and number 1.5 bearing systems 110A, 110B may include tapered roller bearings which provide a line contact.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Figure 5:
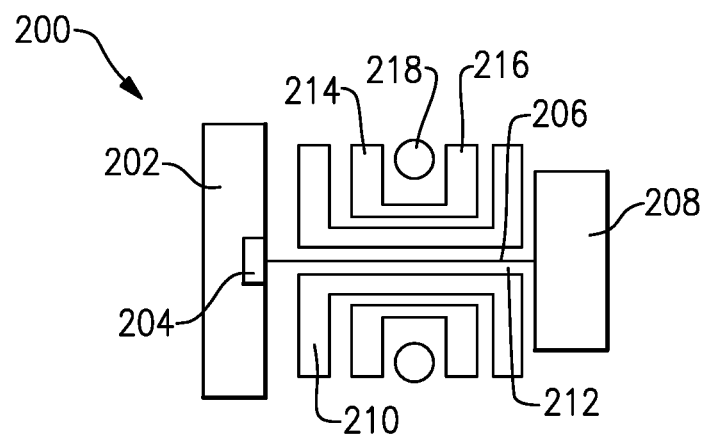
FIG. 5 shows another embodiment.

FIG. 5 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 6:
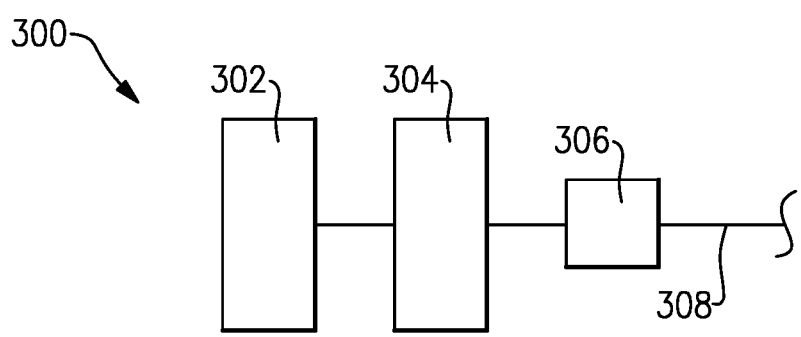
FIG. 6 shows yet another embodiment.

FIG. 6 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
    a bypass ratio greater than about ten (10);
    a fan supported on a fan shaft and having a plurality of fan blades;
    a gutter with an annular channel;
    a gear system connected to the fan shaft, a plurality of planetary gears, and a ring gear with an aperture that is axially aligned with the annular channel, wherein said ring gear includes a first portion with a first set of opposed angled teeth separated by a trough from a second portion with a second set of opposed angled teeth;
    a torque frame at least partially supporting the gear system;
    a low pressure turbine with an inlet, an outlet, and a low pressure turbine pressure ratio greater than 5:1; and
    a low fan pressure ratio of less than 1.45 across the fan blade alone.

2. The gas turbine engine of claim 1, further comprising a support relative to a fixed housing facilitating segregation of vibrations.

3. The gas turbine engine of claim 2, further comprising an input to the gear system, the input facilitates segregation of vibrations.

4. The gas turbine engine of claim 3, wherein the gear system includes a sun gear having a sun gear splined connection.

5. The gas turbine engine of claim 4, wherein the input includes an input splined connection complementary to the sun gear splined connection and said gear system includes a gear reduction ratio of greater than 2.5.

6. The gas turbine engine of claim 5, wherein the fan shaft is supported by at least one tapered roller bearing.

7. The gas turbine engine of claim 5, further comprising a fan tip speed less than 1150 ft/second.

8. The gas turbine engine of claim 1, further comprising a fan tip speed less than 1150 ft/second and a fan supported on a fan shaft and having a plurality of fan blades, and a low fan pressure ratio of less than 1.45 across the fan blades alone.

9. The gas turbine engine of claim 5, wherein the first portion and the second portion of the ring gear each include a radially extending flange that extends radially outward away from a corresponding set of opposed angled teeth, and the fan shaft includes a radially extending flange connected to the radially extending flange on the first portion of the ring gear and the radially extending flange on the second portion of the ring gear.

10. The gas turbine engine of claim 9, further comprising a seal attached to at least one of the radially extending flanges on the ring gear or the radially extending flange on the fan shaft.

11. The gas turbine engine of claim 10, wherein the seal includes an oil return passage.

12. The gas turbine engine of claim 11, wherein the oil return passage includes a slot.

13. The gas turbine engine of claim 12, wherein the slot is located in the seal.

14. The gas turbine engine of claim 12, wherein the slot is located in the radially extending flange on the fan shaft.

15. The gas turbine engine of claim 5, wherein said gutter is for collecting oil expelled from the gear system.

16. The gas turbine engine of claim 15, further comprising a fan tip speed less than 1150 ft/second.

17. The gas turbine engine of claim 16, wherein the gutter is formed from a soft material.

18. The gas turbine engine of claim 17, wherein the soft material is aluminum.

19. A gas turbine engine comprising:
 a fan supported on a fan shaft by at least one roller bearing and having a plurality of fan blades;
 a bypass ratio greater than about ten (10);
 a gutter with an annular channel;
 a planetary gear system connected to the fan shaft, the gear system having a gear reduction ratio of greater than 2.5, a plurality of intermediate gears, and a ring gear with an aperture that is axially aligned with the annular channel, wherein the ring gear includes a first portion separated from a second portion, the first portion and the second portion each include a radially extending flange that extends radially outward away from a corresponding set of opposed angled teeth;
 a torque frame as least partially supporting the gear system with respect to the housing which facilitates the segregation of vibrations and other transients.

20. The gas turbine engine of claim 19, further comprising an input to the gear system, the input facilitates segregation of vibrations.

21. The gas turbine engine of claim 20, wherein the gear system includes a sun gear having a sun gear splined connection and the input includes an input splined connection complementary to the sun gear splined connection.

22. The gas turbine engine of claim 21, wherein the roller bearing is a tapered roller bearing.

23. The gas turbine engine of claim 20, wherein said gutter is for collecting oil expelled from the gear system.

24. The gas turbine engine of claim 23, wherein the gutter is formed from a soft material.

25. The gas turbine engine of claim 24, wherein the soft material is aluminum.

26. The gas turbine of claim 25, further comprising a low pressure turbine with an inlet, an outlet, and a low pressure turbine pressure ratio greater than 5:1, and a low fan pressure ratio of less than 1.45 and the low fan pressure ratio is measured across the fan blades alone.

27. The gas turbine engine of claim 26, wherein the fan shaft includes a radially extending flange connected to the radially extending flange on the first portion of the ring gear and the radially extending flange on the second portion of the ring gear.

28. The gas turbine engine of claim 27, further comprising a seal attached to at least one of the radially extending flanges on the ring gear or the radially extending flange on the fan shaft.

29. The gas turbine engine of claim 28, wherein the seal includes an oil return passage.

\* \* \* \* \*